March 3, 1959  C. BERGER  2,875,588
PRESERVATION OF RED BLOOD CELLS
Filed June 11, 1953
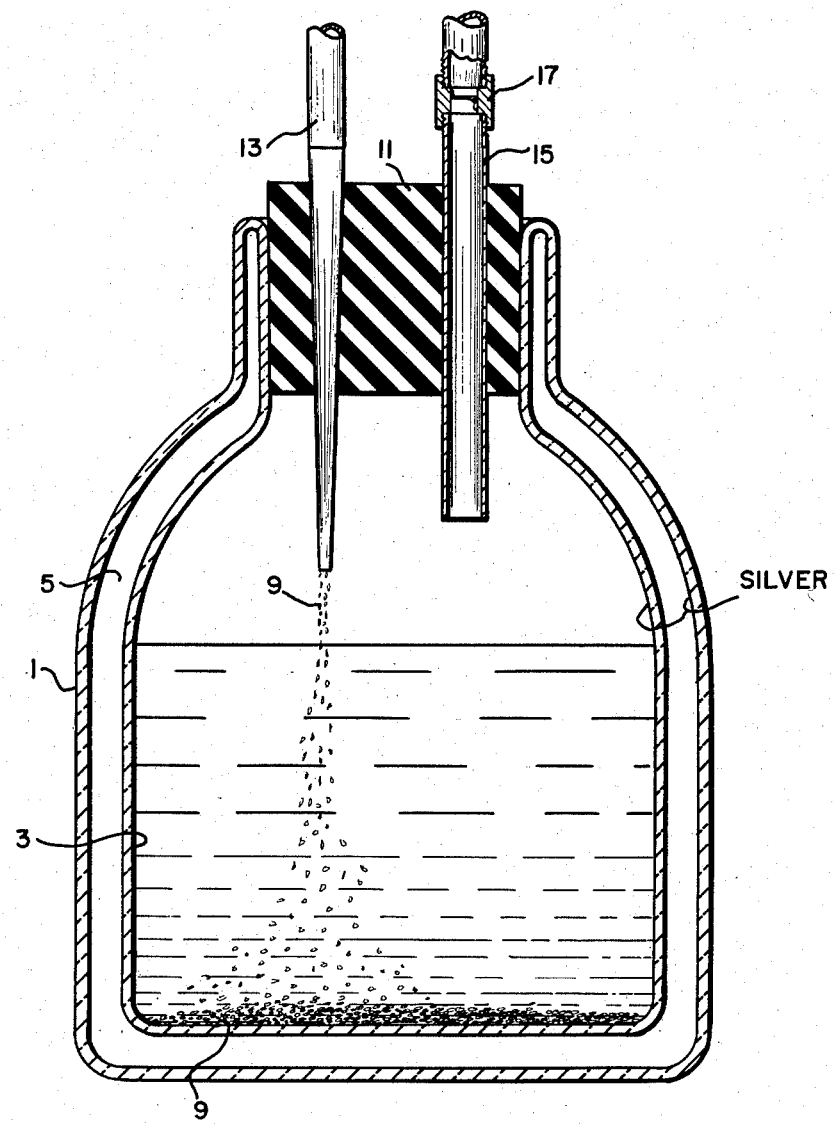
INVENTOR.
CARL BERGER
BY Toulmin & Toulmin
ATTORNEYS

United States Patent Office 2,875,588
Patented Mar. 3, 1959

2,875,588

PRESERVATION OF RED BLOOD CELLS

Carl Berger, Dayton, Ohio, assignor to The Commonwealth Engineering Company of Ohio, Dayton, Ohio, a corporation of Ohio Application June 11, 1953, Serial No. 361,023

4 Claims. (Cl. 62—74)

This invention relates to blood cells and to the freezing and preservation thereof.

Blood cells separated from the plasma by centrifugation have been reported to have been frozen by cooling the cells in a glycerine-saline solution to temperatures of about minus 79 degrees C.; haemolysis is difficult to avoid in such processes and leads to difficulty when the frozen cells are re-constituted for use in physiological processes. Further a large percentage of the cells are burst due to the nature of the freezing technique.

The first difficulty has now been overcome to some extent by dialyzing the glycerine from the cell prior to re-suspension in plasma thus minimizing the cell losses due to haemolysis. However such methods are time consuming and each of the various steps of the process multiplies the possibilities of injury to the cells.

This invention contemplates avoidance of the aforementioned difficulties by achieving the freezing of the cells in such a manner that large crystalline particles of ice substantially do not occur within the cell. Thus in accordance with the present invention the cell is so frozen as to produce a vitreous or glassy state within the cell body, thereby avoiding cell rupture upon cooling. That crystalline ice formation which may tend to occur will be restricted to formation of such tiny particles as to approach the effect of the glassy state attained by this invention.

Cell rupture during freezing is apparently occasioned by the tendency to from large cystals; the growth of such crystals stresses the cell walls and as the large crystal serves as the nucleus for more and more ice addition the wall stresses increase also and the same is finally ruptured through.

Such destructive stressing of the wall may be prevented by occasioning the formation of the ice within the cell in very small crystals or by occasioning the formation of the frozen body in the vitreous state. In the latter instance the wall of the cell is stressed but slightly while the very small crystals due to the nature of their growth do not excessively extend the cell wall.

The blood cell itself consists of a large percent by weight of water, and the solids therein so increase the viscosity that the cell may upon the application of proper techniques described hereinbefore, be caused to attain the vitreous or glassy state. Under this condition the kinetic processes of life of the cell are materially slowed and the cell structure is not deleteriously affected while in the frozen condition.

This impeding of the kinetic processes is advantageous both in preventing cell destruction and in assisting in reconstitution of the cell for physiological uses for no chemical processing is required; dialysis of material from within the cell, for example, necessary in other processes is completely avoided. Further the initial processing to the glassy frozen state is not complicated by chemical treatments and no suspending medium is required for the cells.

It is accordingly a primary object of this invention to describe a novel method for the freezing of blood cells.

It is a principal object of the invention to describe a new and novel physical condition of a frozen blood cell.

It is a further object of this invention to describe means for maintaining the frozen blood cells in their frozen state over a long period of time.

These and other allied objectives of the invention are attained, generally speaking, by freezing the blood cells in a liquid medium which is non-oxidizing and which medium itself is gaseous at normal temperatures. The freezing to the vitreous state is preferably effected by impinging clusters of the blood cells onto the liquid medium at a velocity sufficient to cause the cells to pass beneath the surface of the liquid medium whereby the cells are quickly surrounded by the same and frozen to the vitreous condition.

The liquid medium is most suitably of slightly less density than the blood cells and the latter in the frozen condition then sink slowly to the bottom of the liquid thus leaving a clear surface for impingement and freezing of other cells. The velocity of impingement also tends to cause separation from clusters into individual cells and thus the freezing is quickly attained since the surface area of the cells exposed to the liquid is large.

The liquid medium is housed in a thermos-type bottle or container and as heat slowly enters the apparatus the liquid is gasified and allowed to escape slowly thus insuring the maintenance of low temperature about the frozen cells; upon complete evaporation the cells may be maintained in an atmosphere of the gas if the housing is kept suitably cooled; thus ingress of air to the cells may be readily prevented.

As the medium for freezing of the cells liquid nitrogen is preferred; in liquid from this is somewhat less dense than the blood cells and the latter accordingly accumulate at the bottom of the liquid thus facilitating the freezing of large quantities of the cells in a single container. Further the nitrogen is obtained commercially in a pure form and the cell is not affected thereby in any way since the nitrogen at the low temperatures involved is inert. Other inert gases, for example, argon are useful; argon while obtainable commercially is somewhat heaver than nitrogen, though a poorer conductor of heat; accordingly since accumulation of the cells at the bottom of the liquid is desirable for large quantity collection nitrogen is preferred to argon.

The invention will be more fully understood by reference to the following detailed description and accompanying drawing wherein the single figure illustrates one embodiment of apparatus useful in the practice of the invention.

Referring to the single figure of the drawing there is shown a thermos-flask structure comprising an outer glass wall 1 and an inner glass wall 3 the spacing 5 therebetween being evacuated to a very low pressure. The numeral 7 indicates a body of liquid nitrogen in which frozen blood cells 9 are accumulating.

The container or flask is provided in the mouth thereof with a cold-resistant stopper 11 as of silicone rubber which stopper carries a tapered glass nozzle 13 and a glass escape tube 15 having a check valve 17. Valve 17 is adapted to permit gasified nitrogen to escape very slowly from the flask while preventing ingress of air at all times.

The method of invention is effected by directing a flow of blood cells centrifuged from the whole blood into the apparatus shown all of which has been previously sterilized. The nozzle 13 at its lower end preferably has a diameter of about 35–200 microns and since the blood cells themselves are about 7 microns in diameter a considerable number of cells may pass the nozzle at one time.

Preferably the cells are blown into the apparatus in an atmosphere of the same material which consitutes the liquid medium; in the present instance the atmosphere is therefore nitrogen gas.

The velocity of the cells and gas is dependent upon the nozzle but preferably is such that the cells striking the surface of the liquid nitrogen pass immediately thereunder; such impingement tends also to cause a break-up of any cell agglomeration and accordingly the cells are thereby exposed substantially individually to the action of the cold liquid nitrogen and are frozen immediately. As noted hereinbefore the constitution of the cell together with the quick freeze cause the cell to attain a vitreous or glassy state. Larger clusters if not broken up by the impingement may freeze somewhat less quickly and accordingly some small crystals may tend to form. Small crystals however as previously noted do not affect the cell walls deleteriously.

The liquid nitrogen has a specific gravity of about 0.8 while that of the cells is somewhat greater—that is about one and accordingly after passing through the surface the cells sink to the bottom of the liquid. This maintains the surface clear to receive further impinging cells.

The flask may be readily filled to about ⅓ to ½ of its volume with blood cells and the flask may then be stored in a refrigerated space after closure of nozzle 13.

The valve 17 is maintained very slightly open and as the apparatus tends to pick up heat the liquid nitrogen evaporates passing out through the valve. The apparatus will thus adjust itself over a long period of time to a condition where the frozen cells are surrounded by an atmosphere of nitrogen and the cells due to the surrounding conditions are maintained frozen.

The rate of evaporation of the liquid nitrogen is of course also dependent upon the conditions to which the flask is exposed; the physiological activity of the cell may thus be maintained for long periods of time, that is, years.

There has thus been described a novel and rapid method for the freezing of blood cells into a state which permits retention of physiological activity while restricing the kinetic processes in such manner that deterioration does not result. Storage of the uniquely frozen cells is facilitated under conditions which permit of ready reconstitution of the cells for use.

The material of which the apparatus useful for the invention is constructed is not critical but should be of a nature which permits of ready sterilization.

It will be understood that this invention is susceptible to modification in order to adopt it to different usages and conditions and accordingly, it is desired to comprehend such modifications within this invention as may fall within the scope of the appended claims.

I claim:

1. A process for restricting the kinetic processes in blood cells to prevent deterioration of the cells and to aid retention of the physiological properties of the cell, which process comprises the steps of providing an isolated body of a liquid medium which is non-oxidizing and gaseous at normal temperatures and the vapors of which medium provide the atmosphere above the liquid, and spraying blood cells through the vapors to the body of liquid medium to occasion freezing of the blood cells in the liquid medium, maintaining the frozen cells and the body of liquid medium under refrigeration conditions such that the cells are maintained in the frozen state and the evaporation of the liquid is retarded.

2. A process for restricting the kinetic processes in blood cells to prevent deterioration of the cells and to aid retention of the physiological properties of the cell, which process comprises the steps of providing in a container a liquid medium which is non-oxidizing and gaseous at normal temperatures and the vapors of which medium provide the atmosphere above the liquid, impinging through the said vapors in the container onto the surface of the liquid medium a spray of blood cells to cause the cells to be exposed to the liquid medium and to be frozen thereby restricting the escape of vapor during the refrigeration operation, collecting the cells at the bottom of the container, maintaining the frozen cells and the body of liquid medium under refrigeration conditions such that the cells are maintained in the frozen state and the evaporation of the liquid is retarded.

3. A process as claimed in claim 1 in which the liquid medium is nitrogen.

4. A process as claimed in claim 1 in which the liquid medium is argon.

References Cited in the file of this patent

UNITED STATES PATENTS

| | | |
|---|---|---|
| 1,201,132 | Askenasy | Oct. 16, 1916 |
| 1,534,729 | Obersohn | Apr. 21, 1925 |
| 1,755,810 | Carney | Apr. 22, 1930 |
| 1,976,204 | Voorhees et al. | Oct. 9, 1934 |
| 2,751,762 | Colton | June 26, 1956 |

OTHER REFERENCES

Luyet: Freezing and Drying, 1952, June 1951 relied on, pp. 78–80; Hafner Publishing Co. Inc., New York.

Luyet: Freezing and Drying, 1952, June 1951 relied on, page 84; Hafner Publishing Co. Inc., New York.